(12) United States Patent
Valente

(10) Patent No.: US 6,369,698 B1
(45) Date of Patent: Apr. 9, 2002

(54) DEVICE WITH INTERVAL PLAYBACKS FOR PETS AND INFANTS

(76) Inventor: Nancy Ann Valente, 1630 W. Catalpa Ave., Chicago, IL (US) 60640

(*) Notice: Subject to any disclaimer, the term of this patent is extended or adjusted under 35 U.S.C. 154(b) by 0 days.

(21) Appl. No.: 09/456,722

(22) Filed: Dec. 8, 1999

Related U.S. Application Data

(60) Provisional application No. 60/111,698, filed on Dec. 10, 1998.

(51) Int. Cl.[7] .................................................. G08B 1/00
(52) U.S. Cl. .............................. 340/309.15; 340/573.1; 340/573.3
(58) Field of Search .......................... 340/309.15, 309.4, 340/573.1, 573.3, 692, 322, 384.71

(56) References Cited

U.S. PATENT DOCUMENTS

| | | | |
|---|---|---|---|
| 3,294,910 A | 12/1966 | Jackson | 379/79 |
| 3,843,841 A | 10/1974 | Rubinstein | 379/38 |
| 3,937,004 A | 2/1976 | Natori et al. | 179/5 R |
| 4,508,457 A * | 4/1985 | Aizawa | 368/63 |
| 4,565,902 A | 1/1986 | Phillips | 368/11 |
| 4,785,433 A | 11/1988 | Bush et al. | 368/109 |
| 4,967,696 A | 11/1990 | Tobias | 119/29 |
| D332,409 S | 1/1993 | Magolan | |
| 5,355,839 A | 10/1994 | Mistry | 368/13 |
| 5,373,488 A | 12/1994 | Lidor | 119/858 |
| 5,387,108 A | 2/1995 | Crowell | 434/319 |
| 5,555,536 A * | 9/1996 | Rolf et al. | 369/19 |
| 5,577,918 A | 11/1996 | Crowell | 434/319 |
| 5,640,145 A | 6/1997 | Newham | 340/573.1 |
| 5,752,335 A | 5/1998 | Shimogori et al. | 40/300 |
| 5,926,441 A | 7/1999 | Zinsmeyer et al. | 368/10 |
| 6,111,495 A * | 8/2000 | Garside | 340/309.15 |

OTHER PUBLICATIONS

DeliDome internet advertisement (web site address at bottom of page) and operating instructions, date unknown.

* cited by examiner

*Primary Examiner*—Daryl Pope
(74) *Attorney, Agent, or Firm*—R. Blake Johnston

(57) ABSTRACT

A device for playing back messages recorded by a pet owner or the parent of an infant at selected time intervals so that the pet or infant is comforted in the owner's or parent's absence. The device includes a housing containing a voice chip that is utilized to record and play back the comforting messages. Accordingly, a microphone and speaker are in communication with the voice chip. A clock function is programmed into a microprocessor chip and is in communication with a switch and the voice chip so that the time interval for playbacks may be selected by a user. The device also features a number of indicator lights or a digital display to indicate the selected time interval for playback. The device may optionally include a system for recording and playing back emergency information such as a pet owner's name, address and telephone number.

16 Claims, 5 Drawing Sheets

REMOVE BACK COVER FOR EMERGENCY INFO

DEVICE WITH INTERVAL PLAYBACKS FOR PETS AND INFANTS

This application claims the benefit of the filing date of copending U.S. Provisional Application No. 60/111,698 filed Dec. 10, 1998.

BACKGROUND

The invention relates generally to pet and infant care products and, more particularly to a device that plays messages at selected time intervals to comfort a pet or infant during an owner's or a parent's absence.

The ability for a device to playback at designated intervals a message recorded by a pet owner is valuable in a variety of situations. For example, due to the hectic lives that most people live nowadays, a pet owner is away from his/her pet several hours a day. Such a device allows a pet owner to provide verbal messages for his/her pet while the owner is away at work or out for an extended period each day regardless of whether the pet is confined outdoors or indoors. A loving message, positive words spoken in the familiar voice of the pet owner at intervals of each day can contribute to a happy pet life.

There are many times when a pet gets ill, especially as they get older. Such circumstances may require an overnight stay, or a stay of many nights, at a pet hospital. Pet owners will sometimes leave familiar clothing with the scent of the pet owner in such situations to comfort the pet. A device that provides interval playbacks of verbal messages to the pet as she or he is recuperating provides a further and more significant reminder of the loving support of the owner. As a result, the pet will not feel abandoned which will contribute to a speedier recovery and the pet owner will also feel a sense of relief as they will have the satisfaction of knowing that their pet knows she or he is loved.

Many times pets have to be boarded at a pet facility or with a friend as a family goes out of town on vacation or a pet owner goes out of town on business, etc. A device that enables pet owners to provide verbal messages for their pets makes the pets more comfortable and less anxious as they reside in an unfamiliar setting away from home. Such a device also enables the pet owners to feel at ease with knowing that they are, in effect, making contact with the pet as they are away. This allows the pet owners to have less feelings of anxiety and more enjoyment or productivity during their vacation or business outing.

There are many similar situations where a parent is forced to be away from his or her infant child. A device that allows playback of messages from the parent during the parent's absence also provides both the parent and infant with comfort.

While a variety of products have been offered to provide recorded messages related to pet care, none of these provide comforting messages played back to a pet or an infant at intervals for extended periods of time. For example, a device marketed as the IDECLARE talking pet tag by the MerMax company of Marina Del Ray, Calif., is a recording device enclosed in a tag that is connected to a pet's collar. The owner may record information on the device including the owner's name, address and telephone number. The tag features a clearly marked playback button so that an individual may play back the information upon finding the lost pet. This device does not feature a timer for interval playback. Indeed, the only way to activate the playback feature of the device is to press the playback button.

The DELUXE DELIDOME product, sold by Our Pets, Inc., is a device that dispenses balls filled with cat food or other cat treats at predetermined time intervals. The device may be configured to play back a message recorded by the owner to call the cat when each food ball is released. The device only holds a limited number of food balls. As a result, the message playback occurs only a limited number of times (until the device runs out of food balls). For example, if the device only contains eight food balls, the message is only played back eight times.

Accordingly, it is an object of the present invention to provide a device that plays back recorded messages from an owner or parent to comfort a pet or an infant.

It is a further object of the present invention to provide a device that plays back recorded messages at selected time intervals.

It is still a further object of the present invention to provide a device that plays back recorded messages at selected time intervals that is portable.

These and other objects of the invention will be apparent from the remaining portion of the specification.

SUMMARY

The present invention is directed to a device for recording and playing back at selected time intervals a comforting message for a listener such as a pet or infant. The device includes a housing within which is positioned integrated circuit chips for recording and playing back the comforting message. A speaker and microphone are in communication with a voice chip. A microprocessor chip has the timer or clock programmed therein. A comforting message spoken by a pet owner or parent is recorded onto the voice chip via the microphone. The timer or clock function of the microprocessor chip signals the voice chip so that the comforting message is played back at a selected time interval through the speaker.

The device includes a plurality of indicator lights, each of which corresponds to time interval. A switch for selecting a time interval causes the indicator light corresponding to the selected time interval to illuminate. Each time the switch is pressed, the selected time interval, and therefore the illuminated indicator light, changes. The device may alternatively feature a simple slide switch, rotating switch and/or a digital display for indicating the selected time interval.

The device may include a recording and playback system for emergency information including the pet owner's name, address, telephone number, etc.

For a more complete understanding of the nature and scope of the invention, reference may now be had to the following detailed description of embodiments thereof taken in conjunction with the appended claims and accompanying drawings.

DESCRIPTION

The present invention provides timed playback of a recorded message to comfort a listener such as a pet or an infant in the absence of his or her owner or parent. The listener may be any alternative living entity including, but not limited to, elderly persons, patients, plants, etc. Using pets as an example, the device allows a pet owner to record a message, of 12–15 seconds duration, for example, for his or her pet and then select a time interval for playback of the message (for example, every hour). Playback of the recorded message featuring the owner's voice will keep the pet from becoming lonesome and provide comfort while the owner is away at work, shopping, etc. The device may also be placed in the pet cage while the pet is boarded. The device may alternatively be placed in an infant's crib with recorded messages from a parent. While the device will be described below in terms of usage with pets, it is to be understood that the device may be used in applications involving a variety of alternative living entities.

Figure 1:
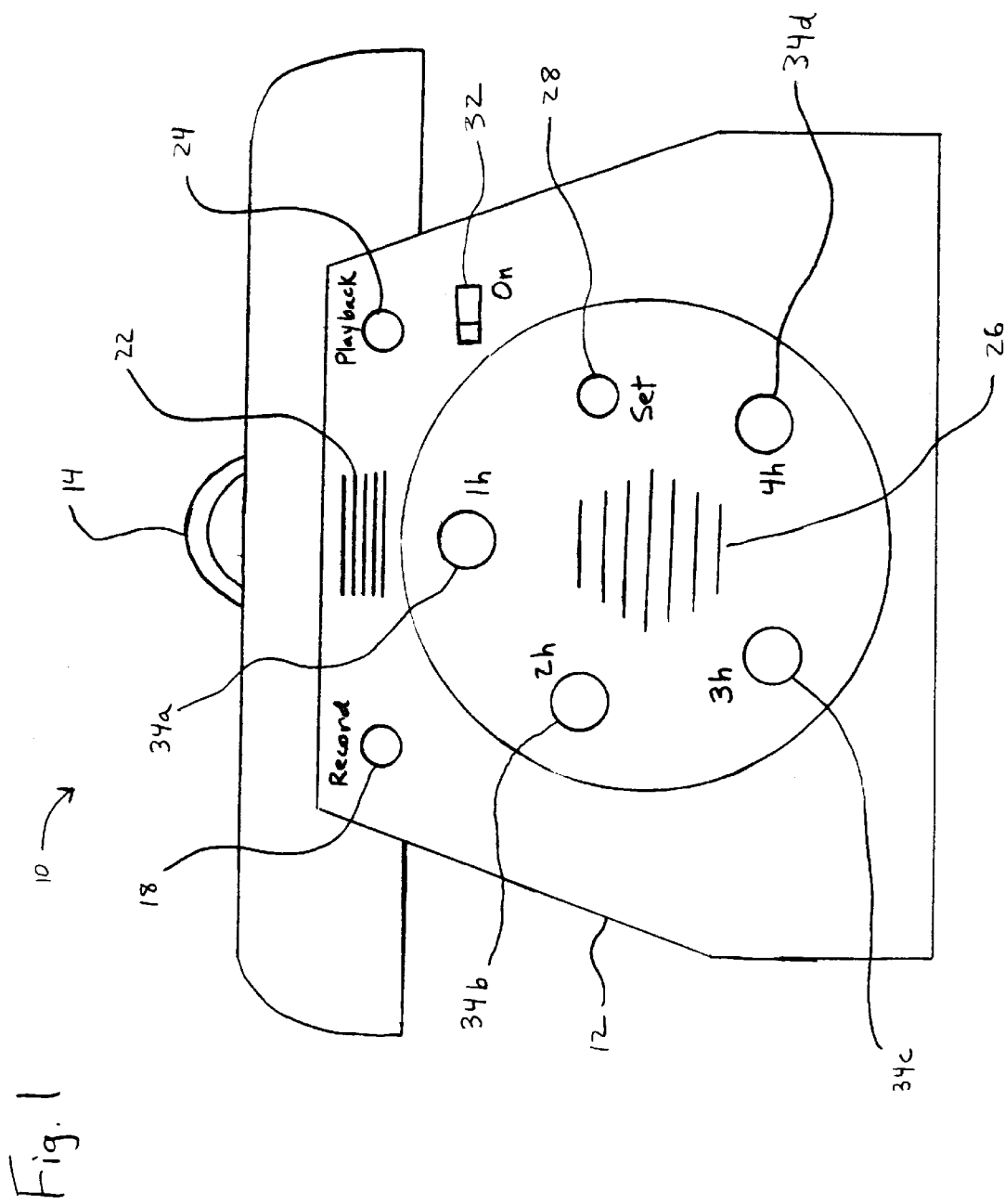
FIG. 1 is a front elevation view of an embodiment of the device of the present invention.

An embodiment of the invention of the present invention is indicated in general at 10 in FIG. 1. The device features a two-piece housing 12 that is molded from plastic, or an alternative durable material, and is shaped to resemble a telephone. The telephone shape symbolizes that the owner is in effect "calling" his or her pet (by providing a recorded message) while away from the pet. Alternative novel shapes, such as a dog bone, etc. may be used instead of the telephone shape. Shapes that are pleasing to a child may be selected if the device is to be used with infants. The device may optionally be sized small enough to hang on the collar of a pet. Hanger 14 may be used to hang the device on the side of a cage, for example, or on a pet collar if the device is sized small enough.

As shown in FIG. 1, the device features a record button 18 and a built-in microphone 22 for recording a message that is stored in the device. The user speaks into the microphone 22 while depressing the record button 18 to record his or her message. The playback 24 button allows the user to hear the message through speaker 26. A set button 28 allows the user to select the playback interval once the message is recorded. An on/off button 32 allows the device to be switched on or off.

Indicator lights 34a–34d, which may be, for example, two-color light emitting diodes (LED's), provide an indication as to which time interval is selected. For example, light 34a corresponds to one hour, light 34b corresponds to two hours, light 34c corresponds to three hours and light 34d corresponds to four hours. Note that these time intervals are presented as examples only. In instances where the device is used for an infant, for example, time intervals of fifteen minutes, thirty minutes, forty-five minutes and sixty minutes may be appropriate. When the set button 28 is pressed, all of the lights 34a–34d illuminate. The selected interval, however, illuminates in green while the remaining, non-selected intervals illuminate in red. Alternatively, the lights may be one-color LED's and configured so that when the set button 28 is pressed, only the light corresponding to the selected interval illuminates while the remaining lights remain extinguished. LED's that permit such operation are well known in the art.

Every time the set button 28 is pressed, the next neighboring time interval is selected (traveling in a counterclockwise direction around the "dial"). For example, continuing with the configuration where the light for the selected interval illuminates in red, the set button is pressed once and light 34a shines green (the remaining lights shine red) indicating that the one hour interval is selected. The set button 28 is released and the lights extinguish. The device will now play back the recorded message once every hour. If the set button 28 is pressed again, light 34b is illuminated in green and the remaining lights shine red. This indicates that the two-hour interval is selected. The device will now play back the message every two hours. Repeating the above procedure allows the remaining time intervals to be selected. Note that, as described in greater detail below, a digital indicator or incremented switch/dial arrangement may be substituted for the lighting feature described above to permit selection of the playback intervals.

Figure 2:
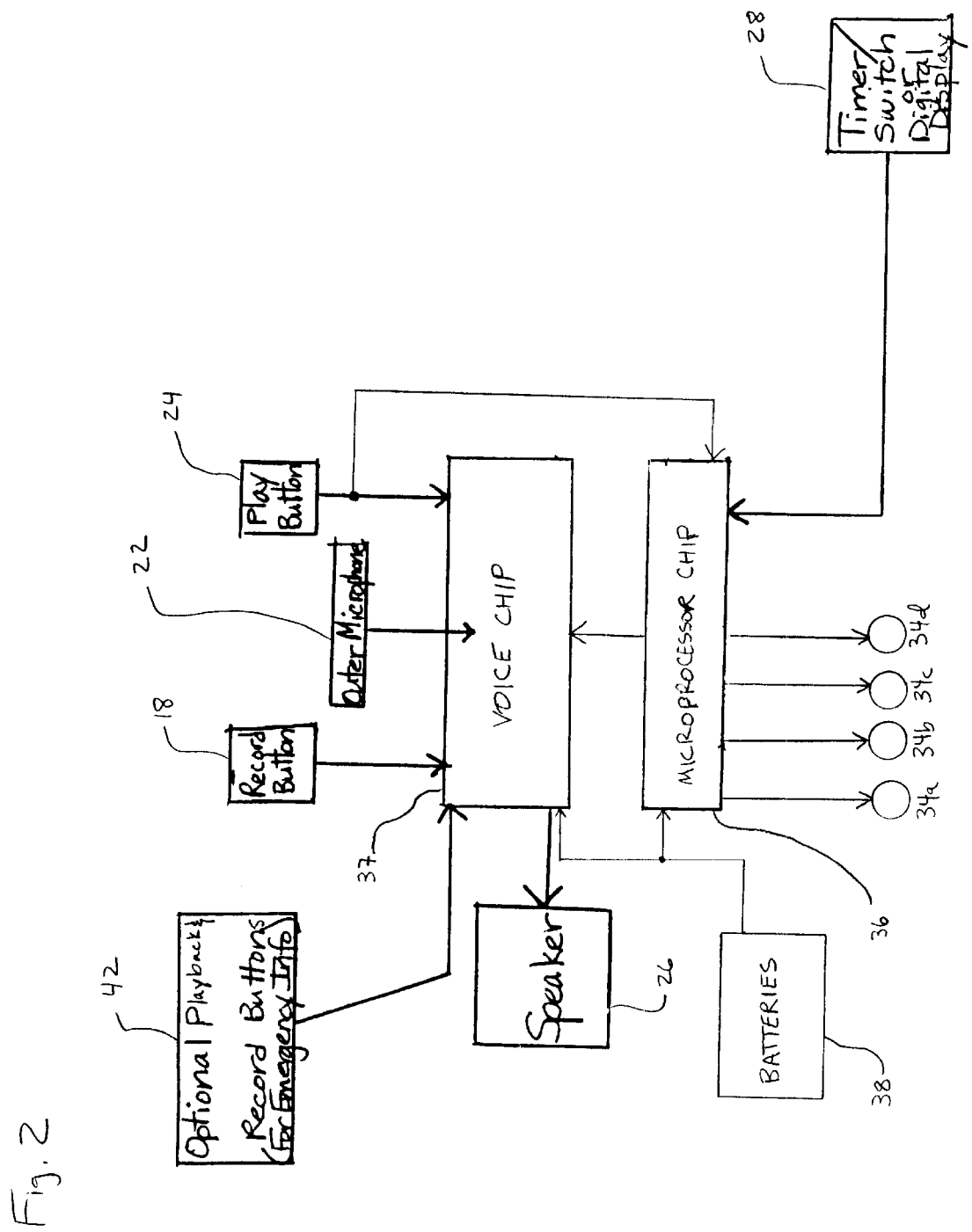
FIG. 2 is a schematic diagram of the device of FIG. 1.

The schematic for the device 10 of FIG. 1 is shown in FIG. 2. As is known in the art, the components of FIG. 2 may communicate with one another via a circuit board, wires or the like. The device records and plays back a message by way of a microprocessor chip 36 and a voice chip 37. More specifically, the message is recorded onto the voice chip 37 via microphone 22 when the record button 18 is pressed. The microprocessor chip 37 is programmed to control the playback of the message, provide a clock function for timing the intervals between playbacks and toggle the lights 34a–34d as the playback interval is selected. As such, the microprocessor chip acts as the "brain" of the device. Such voice chips and microprocessor chips are known and available in the art. While the embodiment shown stores the recorded message on the voice chip 37, it is to be understood that alternative recording devices, such as recording tape, may be utilized. The device is powered by batteries 38 (for example, size AAA).

As illustrated at 42, the device may optionally include a second set of record and playback buttons, which may be positioned on the back of the unit, and a second recording capability to allow a second message to be recorded. This second message may include emergency information for the pet, such as the pet owner's name and address, in the event that the pet is lost and is wearing the device as a pet tag. As a result, a person finding the lost pet may press the separate playback button (labeled "emergency info", for example) to find out where to return the pet or who to call. The second recording capability for the emergency information may be provided by voice chip 37 or a separate voice chip.

Figure 3:
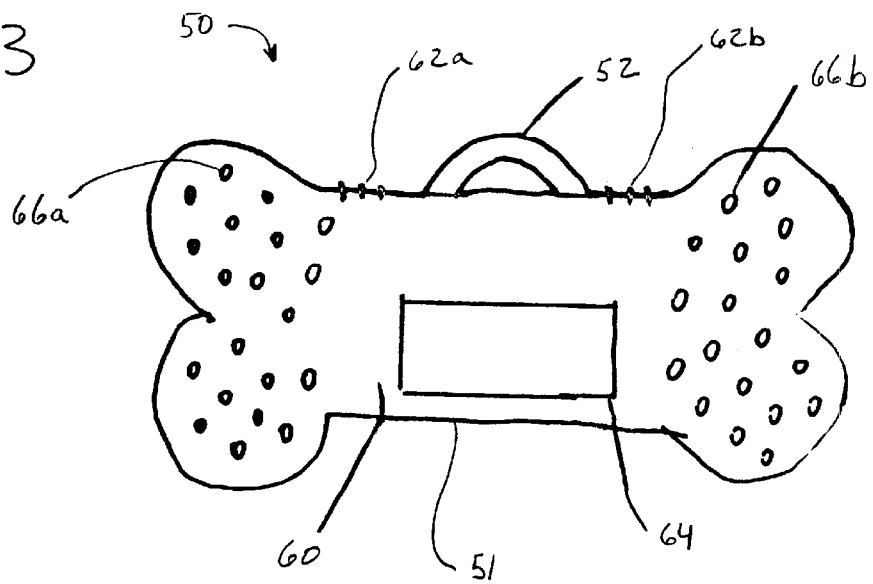
FIG. 3 is a front elevation view of a second embodiment of the device of the present invention.
Figure 4:
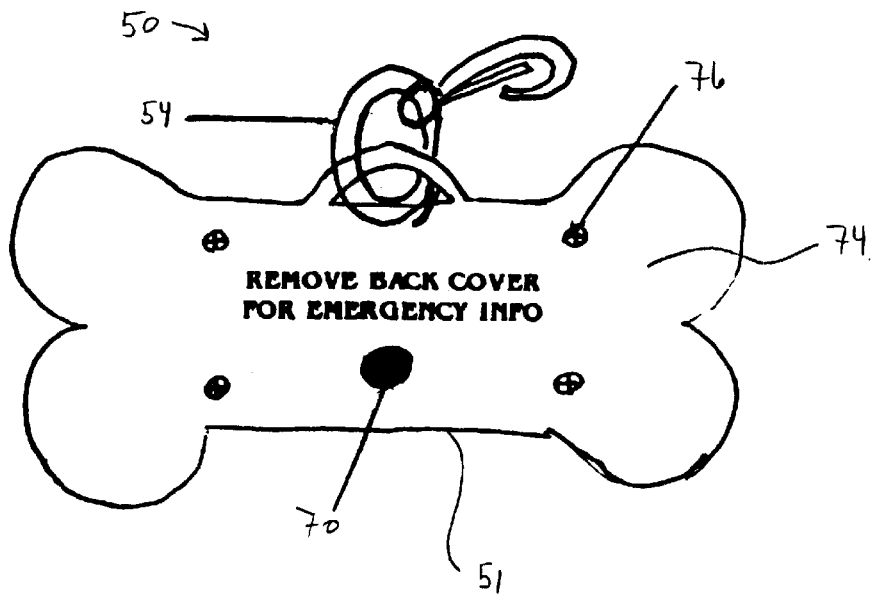
FIG. 4 is a rear elevation view of the device of FIG. 3.

A second embodiment of the present invention is illustrated in general at 50 in FIG. 3. Device 50 features a housing 51 that is preferably constructed of plastic and sized small enough to be fastened to a pet collar via hanger 52 and a standard ring and clip 54 (FIG. 4). The housing 51 is watertight so that the internal components of the device are not damaged due to weather conditions. The device may also be attached to a cage (or crate) while the pet is confined at home, boarded elsewhere or while staying overnight at a pet hospital.

The device 50 features a front cover 60 that is secured to the remaining portion of the device by hinges 62a and 62b and snaps into the closed position illustrated in FIG. 3. An area 64 for writing or removably placing the pet's name is attached to the front of the cover 60 for easy viewing. The cover features perforated portions 66a and 66b so that sound from speakers (discussed below) may pass through. The cover protects the unit controls, which will be discussed below, from accidental manipulation or damage. Recessed buttons or switches or a sliding flap cover may be substituted for the hinged cover 60.

The device optionally includes a recording feature that is reserved for emergency information only. This recording feature is for recording the pet's name and/or the owner's name, address, telephone number, e-mail address or whatever important information is needed to ensure the proper return of the pet in case the pet becomes lost. This information does not play back at various timed intervals but remains idle until a playback button on the back of the device, indicated at 70 in FIG. 4, is depressed.

The button for recording the emergency information (indicated at 71 in FIG. 7) is accessed by removing the back of the device 74. This is accomplished by removing screws 76. The positioning of the emergency information recording button inside of the device housing further protects the emergency information from accidental loss. The emergency information may be recorded through a dedicated microphone positioned within the device housing. Alternatively, the emergency information may be recorded using the same microphone that is used to record the interval messages for the pet. The emergency information playback utilizes the same speakers as the interval message playback.

Figure 5:
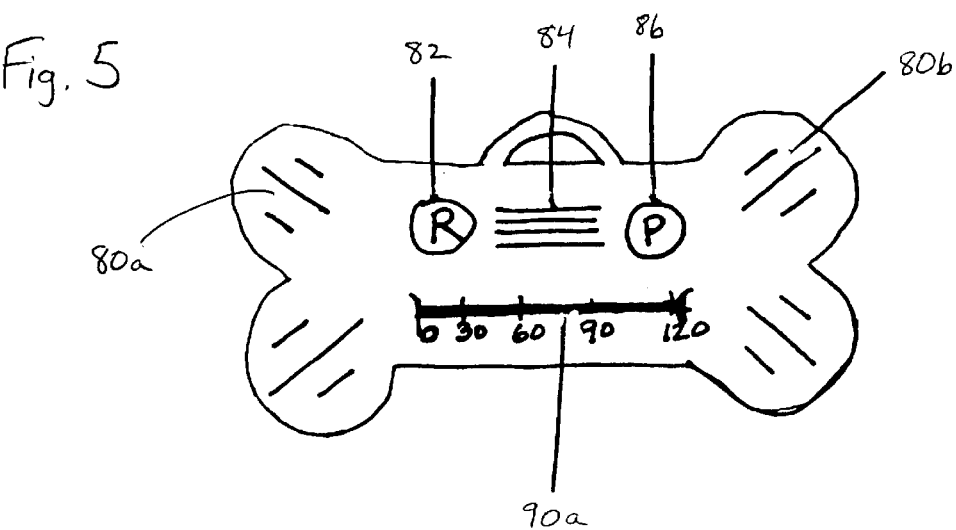
FIG. 5 is a front elevation view of the device of FIG. 3 with the front cover removed.

The front of the device with the cover open/removed is shown in FIG. 5. Speakers 80*a* and 80*b* are positioned on both sides of the unit controls. A record button 82 allows a message to be recorded for a pet or infant. In order to record an outgoing message, a user depresses the record button while speaking in a normal tone into the mini-microphone 84. In order to hear the outgoing message playback, the playback button 86 is depressed. To set the message playback interval, a user moves the slide switch 90*a* to the desired playback interval (thirty, sixty, ninety or one hundred and twenty minutes in the embodiment of FIG. 5). It should be noted that alternative switch arrangements, such as a rotating switch, may be utilized.

Figure 6:
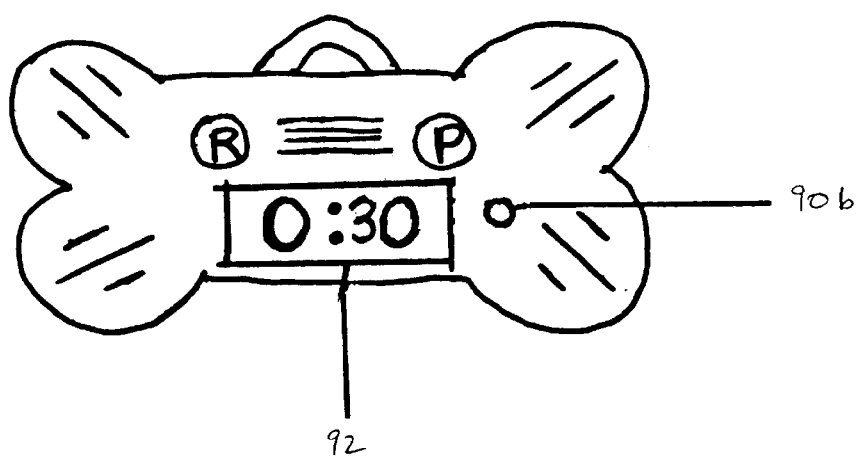
FIG. 6 is a front elevation view of a third embodiment of the device of the present invention with the front cover removed.

As illustrated in FIG. 6, the switch may optionally include a digital display 92 for indicating the selected playback interval. The playback interval may be selected by depressing set switch 90*b*. More specifically, as the set switch 94 is pressed multiple times, the digital display 92 toggles through the choice of time intervals. When the displayed setting is zero, the message is not played.

Figure 7:
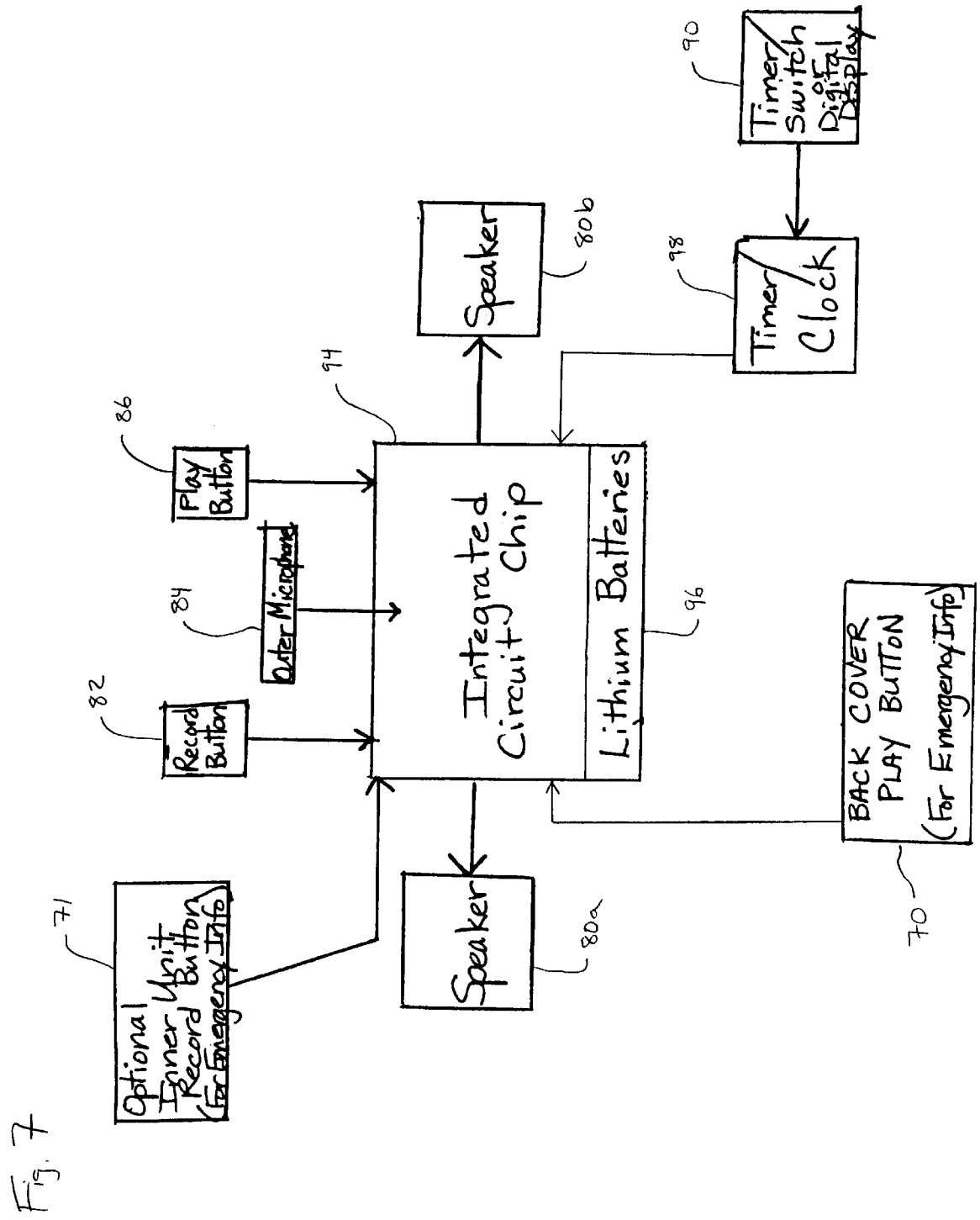
FIG. 7 is a schematic diagram of the devices of FIGS. 3–6.

As illustrated in FIG. 7, the device of FIGS. 3–6 operates using an integrated circuit (IC) chip 94 to record the message(s) and provide playback. More specifically, the microphone 84 records the messages for interval playback on the IC chip 94 or similar electronic circuitry or components. The emergency information is recorded via button 71 on a separate portion of the IC chip 94. Power is obtained from one or more small lithium batteries 96 such as those used in wristwatches. A timer/clock 98 signals the IC chip when the interval selected by switch 90 has passed. As is known in the art, the components of FIG. 7 communicate with one another via a circuit board, wiring or the like.

The shape of the housing of the device is open to creativity. Regardless of the design whether it be a fire hydrant or bone for dogs, fish shape for cats, rattle for infants, etc. the operating functions remain the same. Colors are another option for creativity. Another option is to provide a small plastic compartment on the back cover of the unit to include any additional information about the pet or pet owner.

It is to be understood that while the preferred embodiments of the invention have been shown and described, it will be apparent to those skilled in the art that changes and modifications may be made therein without departing from the spirit of the invention, the scope of which is defined by the appended claims.

What is claimed is:

1. A device for recording and playing back at a selected time interval a comforting message for a listener comprising:

a) a housing;
   b) a microphone disposed within said housing;
   c) a speaker disposed within said housing;
   d) circuitry for recording the comforting message through said microphone and for playing back the comforting message through said speaker;
   e) a plurality of indicator lights each of which corresponds to a time interval positioned upon said housing;
   f) a switch for selecting a time interval attached to said housing, said switch in communication with the plurality of indicator lights so that a time interval is selected and the indicator light corresponding to the selected time interval illuminates when the switch is actuated; and
   g) a clock in communication with the switch for selecting a time interval and the circuitry so that the comforting message is repetitively played back at times corresponding to the selected time interval.

2. The device of claim 1 wherein the circuitry for recording and playing back the comforting message includes a voice chip.

3. The device of claim 1 wherein the clock includes a programmed microprocessor chip.

4. The device of claim 1 further comprising means for recording and playing back emergency information.

5. The device of claim 1 wherein the indicator lights are two-color lights emitting diodes and the indicator light corresponding to the selected time interval illuminates in a color that is different from that of the remaining indicator lights when the switch is depressed.

6. The device of claim 1 wherein indicator lights corresponding to non-selected time intervals remain extinguished when said switch is depressed.

7. The device of claim 1 wherein each time the switch is depressed, the selected time interval changes.

8. The device of claim 1 wherein said time interval is less than twenty-four hours.

9. A device for recording and playing back at a selected time interval a comforting message for a listener comprising:

a) means for recording and playing back the comforting message;
   b) a speaker in communication with the means for recording and playing back the comforting message;
   c) a microphone in communication with the means for recording and playing back the comforting message;
   d) a plurality of indicator lights each of which corresponds to a time interval;
   e) a switch for selecting a time interval, said switch in communication with the plurality of lights so that a time interval is selected and the light corresponding to the selected time interval illuminates when the switch is actuated; and
   f) a clock in communication with the switch for selecting a time interval and the means for recording and playing back the comforting message, said clock signaling the means for recording and playing back the comforting message so that the comforting message is played back through the speaker periodically in accordance with the selected time interval as computed from a time at which the selected time interval was selected.

10. The device of claim 9 wherein the means for recording and playing back the comforting message includes a voice chip.

11. The device of claim 9 wherein the indicator lights are two-color light emitting diodes and the indicator light corresponding to the selected time interval illuminates in a color that is different from that of the remaining indicator lights when the switch is depressed.

12. The device of claim 9 wherein indicator lights corresponding to non-selected time intervals remain extinguished when said switch is depressed.

13. The device of claim 9 wherein each time the switch is depressed, the selected time interval changes.

14. The device of claim 9 wherein said time interval is less than twenty-four hours.

15. A device for recording and playing back at a selected time interval a comforting message for a listener comprising:
   a) a housing;
   b) an integrated circuit chip for recording and playing back the comforting message disposed within said housing;
   c) a microphone disposed within said housing and in communication with said integrated circuit chip so that the comforting message may be recorded on said integrated circuit chip;
   d) a speaker disposed within said housing and in communication with said integrated circuit chip;
   e) a timer in communication with said integrated circuit chip;
   f) a switch in communication with said timer so that a time interval between repetitive playbacks of the comforting message may be selected so that the integrated circuit chip plays back the comforting message through the speaker at times corresponding to the selected time interval based upon a time that the selected time interval was selected.

16. The device of claim 15 wherein said time interval is less than twenty-four hours.

* * * * *